3,216,790
PREPARATION OF SODIUM HYDROSULFITE
Jawad H. Murib, Cincinnati, Ohio, assignor to National Distillers and Chemical Corporation, New York, N.Y., a corporation of Virginia
No Drawing. Filed Mar. 22, 1962, Ser. No. 181,776
7 Claims. (Cl. 23—116)

This invention relates to a method for preparing sodium hydrosulfite. More particularly, this invention relates to the preparation of anhydrous sodium hydrosulfite by a process which consumes only sodium and sulfur dioxide, using a trialkoxyborohydride as an intermediate reactant.

Methods now in commercial use for the production of sodium hydrosulfite involve the reduction of sodium bisulfite with zinc dust in aqueous medium to produce an initial mixture of salts, from which sodium hydrosulfite is crystallized and isolated by special procedures. The solid thus formed still contains water of hydration ($Na_2S_2O_4 \cdot 2H_2O$), which makes certain special treatments necessary for its dehydration and stabilization. Sodium hydrosulfite is a valuable bleaching agent.

Chemists have long sought to prepare sodium hydrosulfite through the direct action of sulfur dioxide on sodium in various forms such as elemental sodium, sodium amalgam and sodium hydride. Such attempts have met with little success, generally because of low yields or because excessive amounts of unstable, impure products were formed.

One object of this invention is to provide a method for the direct production of an anhydrous, stable sodium hydrosulfite, using anhydrous conditions. Another object of this invention is to provide a method for the production of anhydrous sodium hydrosulfite which consumes only sodium and sulfur dioxide, while recycling the intermediate reactants. A further object of this invention is to provide a simple and economical method for the preparation of high quality, anhydrous sodium hydrosulfite with both high conversion and high yield. Other objects will become apparent from the ensuing detailed description of the invention.

According to the novel process of this invention, sodium hydrosulfite is prepared by a two-step process which consumes only sodium and sulfur dioxide. In this process sulfur dioxide is reduced by a sodium trialkoxyborohydride directly and in high yield to form a stable sodium hydrosulfite according to the following reaction:

$$2NaHB(OR)_3 + 2SO_2 \rightarrow Na_2S_2O_4 + H_2 + 2B(OR)_3 \quad (1)$$

wherein R is a saturated aliphatic hydrocarbon radical of from about 1 to 6 carbon atoms, e.g., methyl, ethyl, isopropyl, tertiary buyl, etc. The by-products, hydrogen and boron trialkoxide can be recycled to the process by reacting them with sodium to regenerate sodium trialkoxyborohydride according to the known reaction:

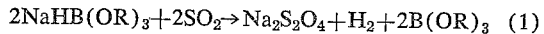

Summation of equations (1) and (2) gives the following overall reaction:

$$2Na + 2SO_2 \rightarrow Na_2S_2O_4 \quad (3)$$

This equation shows that when reaction (2) is combined with reaction (1), the process consumes only sodium and sulfur dioxide.

The sodium trialkoxyborohydride can also be prepared by the reaction of sodium hydride and boron trialkoxide:

Reaction (1) can be carried out as either a homogeneous or a heterogeneous reaction. In the former and preferred manner, a mutual organic solvent for the sodium trialkoxyborohydride and sulfur dioxide is selected. Such solvents include isopropyl alcohol, tertiary butyl alcohol, dioxane, tetrahydrofuran, and diglyme (diethyleneglycol dimethyl ether). The use of other alcohols and ethers is less desirable. In the alcohols, at temperatures above about 0° C., the sodium trialkoxyborohydride tends to alcoholyze. In the ethers, while the triisopropoxyborohydride is stable, the trimethoxy- and triethoxyborohydrides tend to disproportionate to undesirable by-products. Both alcoholysis and disproportionation can be minimized by (1) carrying out the reaction at the lowest temperature consistent with a satisfactory reaction rate, broadly from about −30° to +65° C., and preferably, from −15° to +25° C., and (2) minimizing the storage time of sodium trialkoxyborohydride solutions, particularly at temperatures above 0° C., prior to the contact of such solutions with sulfur dioxide. In spite of the above limitations, the homogeneous reaction is preferred since the sodium species and the sulfur dioxide contact each other in homogeneous solution thereby leading to a relatively rapid and complete reaction.

In the heterogeneous method of carrying out reaction (1), operable inert diluents include saturated hydrocarbons such as hexane, heptane, kerosene, etc., as well as boron trimethoxide or liquid sulfur dioxide. The reaction may also be carried out in the absence of liquid mediums, that is, through direct contact of gaseous sulfur dioxide with solid sodium trialkoxyborohydride. With either of these two heterogeneous techniques, the reaction rate and degree of conversion are somewhat hindered by the coating of the sodium hydrosulfite around the unreacted particles of sodium trialkoxyborohydride, thereby preventing ready contact between the sulfur dioxide and the sodium trialkoxyborohydride.

In carrying out reaction (1) by the homogeneous technique, sulfur dioxide, ether as a pure gas or liquid, or in solution is contacted with a solution of sodium trialkoxyborohydride. Reaction in solution is practically instantaneous, and therefore, contact time is not critical. It is preferred to use an excess of sulfur dioxide, namely, at least about 10 percent over theory (see reaction 1). The pressure of the sulfur dioxide is not considered critical. The sodium hydrosulfite product precipitates as formed. It can be recovered in essentially pure form by filtering and washing with fresh solvent. Alternatively, it can be recovered by volatilizing off the hydrogen and boron trialkoxide.

In carrying out reaction (1) by the heterogeneous technique, sulfur dioxide in gaseous or liquid form is contacted with the sodium trialkoxyborohydride in solid form, or as a suspension in an inert diluent. Contact times to produce substantial yields by this technique are in the order of several days. The sodium hydrosulfite product is generally contaminated with considerable quantities of sodium trialkoxyborohydride, although purification is possible by washing with compounds such as isopropyl alcohol, tertiary butyl alcohol, and dioxane. Tetrahydrofuran and diglyme are not satisfactory because they tend to induce insoluble reaction products from sodium trialkoxyborohydride.

As aforementioned, the maximum reaction temperature is about 65° C. Above this value, the sulfur dioxide tends to be reduced by the sodium trialkoxyborohydride to products other than sodium hydrosulfite.

Reaction (2) can be carried out in situ by heating sodium, hydrogen and the boron trialkoxide in the presence of suitable inert hydrocarbons such as hexane, heptane, kerosene, etc., at temperatures of 150–250° C. under a partial pressure of hydrogen of 100–1000 p.s.i.g. The hydrocarbon diluent is preferred, but not necessary. When a hydrocarbon diluent is not employed, use of excess boron trialkoxide is desirable to provide adequate reaction conditions for the formation of $NaHB(OR_3)_3$.

Reaction (4) can be carried out in situ by heating sodium hydride and the boron trialkoxide in the presence of a suitable diluent, e.g., inert hydrocarbons such as hexane, heptane, kerosene, etc., or excess boron trialkoxide. Conveniently, the reaction is effected under atmospheric pressure between room temperature and the reflux temperature of the diluent.

The following examples are presented only to illustrate this invention and are not intended to limit it. Obvious modifications will occur to persons skilled in the art.

Characterization and analysis of the product were carried out by the following methods: (a) polarographic studies showed that the product exhibited a reduction wave at −0.43 volt against a standard calomel electrode, a value which is identical to that given by sodium hydrosulfite, W. Furness, "J. Soc. Dyers and Colourists," 66, 270 (1950); (b) Infrared analysis showed that Nujol mulls prepared from the anhydrous solid product had absorption bands at $9.4\mu$ and at $10.9\mu$ which are characteristic of sodium hydrosulfite; (c) Titration of the product with potassium ferricyanide in alkaline medium showed that the reduction rate is the same as that effected by known sodium hydrosulfite which is measurably faster than that of sodium trimethoxyborohydride, "Proceedings of the National Institute of Sciences of India," 15, No. 4, 115 (1949).

All reactions were carried out in the absence of air and moisture.

Example I

PREPARATION OF $NaHB(OR)_3$

A. $Na+H_2+B(OR)_3$: Sodium trimethoxyborohydride was prepared by heating elemental sodium (46 g.) with 214.2 g. of trimethyl borate and hydrogen in 672 grams of heptane at a total pressure of 500–1000 p.s.i.g. at 150°–204° C. in a Parr pressure reactor for about 2.5 hours. Analysis of the white solid product gave the ratios Na:H:B as 1.11:1.00:1.07, which are close to those required by the formula $NaHB(OCH_3)_3$. The high values of Na and B are attributed to hydrolysis by some moisture during handling of reagents.

B. $NaH+B(OR)_3$: To a sample of 2.363 grams of NaH contained in kerosene dispersion (10.68% NaH), 13.839 grams of $B(OCH_3)_3$ were added from the top of a condenser. The mixture was allowed to stand at room temperature for two days. Stirring was provided until prevented by the increase in the volume of solid. To the mixture was added an additional amount of 8.564 grams of $B(OCH_3)_3$. The temperature was then raised slowly and the reaction mixture was allowed to reflux at 60–70° C. for six hours. The excess trimethyl borate and kerosene were removed by evacuation and separated by fractional condensation at traps held at −23° and −80° C. The former retained the kerosene while the latter trapped trimethyl borate. From the amount of $B(OCH_3)_3$ recovered (10.421 grams), the amount reacted was calculated, and a molar ratio of $NaH:B(OCH_3)_3$ of 1:0.985 was obtained. The product formed was a pure white solid which upon hydrolytic analysis gave the ratios Na:H:B of 1.03:1.00:1.08.

Example II

In an evacuated 100 ml. round bottom flask were placed 86.40 grams of a clear solution of dioxane, containing 1.05 g. (4.50 mmoles) of $NaHB(OCH_3)_3$. Immediately thereafter this solution was subjected to a pressure of sulfur dioxide of 300 mm. Hg at room temperature for about 1 hr. to give a white solid deposit with the simultaneous evolution of gaseous hydrogen. Polarographic analysis performed on the solid after separation from the dioxane solution showed that the product gave a reduction wave at −0.43 volt against a calomel standard electrode. This polarographic wave was identical to that of known $Na_2S_2O_4$. The amount of sodium hydrosulfite produced was 204 mg. (or 1.17 mmoles $Na_2S_2O_4$) corresponding to a conversion of 52.2% of theoretical.

Example III

In a 100 ml. round bottom flask provided with a magnetic stirrer was placed 50 ml. of dry tetrahydrofuran saturated with sulfur dioxide at room temperature and atmospheric pressure. To this solution 18.833 grams of a clear, freshly prepared solution of 1.995 grams (15.29 mmoles) of sodium trimethyoxyborohydride in tetrahydrofuran was added dropwise. A brown solid deposited with the evolution of gaseous hydrogen which was allowed to escape through a mercury bubbler. Upon addition of excess gaseous sulfur dioxide and allowing the reaction mixture to stir for 3 days at room temperature, the brown solid changed to a white solid. After standing at room temperature for 2 additional days, a sample was dissolved in $NH_4OH$–$NH_4Cl$ buffer and analyzed by the ferricyanide method. The titration showed that 1.295 g. (7.43 mmoles) of $Na_2S_2O_4$ had formed, corresponding to a conversion of 97.5% of theory.

Example IV

A 0.50 gram sample of sodium trimethoxyborohydride, $NaHB(OCH_3)_3$, was dissolved in 25 ml. diglyme, and the solution was filtered under an inert atmosphere. Gaseous sulfur dioxide at one atmosphere pressure was swept over the surface of the clear solution for about 2 hours. Sodium hydrosulfite was deposited simultaneously with the formation of gaseous hydrogen.

Example V

Sodium triisopropoxyborohydride was prepared by treating 81.5 g. of a suspension of 10.8% NaH in kerosene with 62.5 grams of triisopropyl borate in 200 grams of tetrahydrofuran at 65–70° C. for 3 days.

Analysis of the clear solution showed the molar relationship Na:B:H to be 1.035:1.032:1.00.

A 100 ml. sample of this solution containing 92.3 mmoles of sodium triisopropoxyborohydride (17.62 grams) was added to 7.5 grams of $SO_2$ (117.2 mmoles) dissolved in 300 ml. of tetrahydrofuran. A tannish-white solid deposited. The reaction mixture was heated at 55–60° C. for about 30 minutes. The volatile materials (hydrogen, boron triisopropoxide, tetrahydrofuran, excess $SO_2$, and most of the kerosen) were removed by distillation in vacuo. A sample of the solid, 146.3 mg., was analyzed by the ferricyanide method and showed to contain 85.2 mg. $Na_2S_2O_4$. The yield was 35.0 mmoles (6.10 g. or 76% theory) of $Na_2S_2O_4$.

Example VI

Gaseous sulfur dioxide was added at atmospheric pressure to 62.64 grams of tetrahydrofuran solution at 0° C., containing 3.72 grams (29.10 mmoles) $NaHB(OCH_3)_3$. At the initial stages of the reaction a brown solid appeared which, upon addition of excess sulfur dioxide gradually, became lighter in color. The agitation of the reaction mixture was continued for 3 hrs. The flask containing the reaction mixture was then attached to a vacuum sytsem and excess sulfur dioxide, liberated trimethyl borate, and tetrahydrofuran were removed by evacuation. The white solid residue left behind was treated with anhydrous methyl alcohol to destroy unreacted $NaHB(OCH_3)_3$. The evolved hydrogen and excess methyl alcohol were removed by evacuation, and the solid remaining was examined for its hydrosulfite content. Polarographic analysis disclosed that the solid contained 2.00 grams (11.50 mmoles) $Na_2S_2O_4$ corresponding to a conversion of 80% of theory.

Example VII

In an evacuated round bottom flask was placed 1.150 grams of NaHB(OCH$_3$)$_3$ (9.00 mmoles). To this solid, gaseous sulfur dioxide was admitted at room temperature and atmospheric pressure. A brown solid appeared which slowly assumed a white color after standing overnight at room temperature. The volatile materials were removed and separated by fractional condensation. The fraction trapped at −79° C. exerted a vapor tension of 37.0 mm. at 0° C., compared to 37.2 mm. for B(OCH$_3$)$_3$. The amount of trimethyl borate generated was 5.85 mmoles showing that 65% of the initial NaHB(OCH$_3$)$_3$ had reacted. The solid residue so obtained weighed 0.920 grams. Polarographic analysis showed that the solid contained 0.515 grams (or 2.89 mmoles) of Na$_2$S$_2$O$_4$, corresponding to 98.1% of the amount expected from the reaction of 5.85 mmoles of the trimethoxyborohydride. The observed ratio of liberated B(OCH$_3$)$_3$ to Na$_2$S$_2$O$_4$ formed was 2.02, in good agreement with the expected value of 2.00 according to reaction (1).

A sample of the solid product was stored in a desiccator, and after three weeks it was analyzed again for its hydrosulfite content and found to contain the same amount initially present. Thus, sodium hydrosulfite prepared by this route is characterized by storability and extreme stability.

*Example VIII*

In a 100 ml. sealed-off bulb were placed 2.13 grams (6.65 mmoles) of NaHB(OCH$_3$)$_3$, 2.85 grams (44.6 mmoles) of SO$_2$ and 40 ml. of n-heptane. The bulb was heated at 45° C. for 2–3 hours. The flask was then opened and the evolved hydrogen and excess sulfur dioxide were removed. The remaining reaction mixture was then analyzed by the ferricyanide method. It was found that 0.265 gram (1.49 mmoles) of Na$_2$S$_2$O$_4$ had formed (18% conversion), and that hydrogen gas was generated upon solution of the solid residue in the aqueous phase, indicating hydrolysis of unreacted trimethoxyborohydride.

When the reaction was carried out in kerosene at 90–100° C., the product showed no reduction power towards potassium ferricyanide and indigo blue. This indicates that the reaction at high temperatures leads to undesirable products.

*Example IX*

A sample of NaHB(OCH$_3$)$_3$, 1.098 grams (84.3% pure) was placed in a 100 ml. round bottom flask provided with a magnetic stirrer and a sealed-off side arm. The content of the flask was evacuated, and gaseous sulfur dioxide (5.27 grams) was condensed onto the solid NaHB(OCH$_3$)$_3$ by means of liquid nitrogen cooling The flask was sealed off and the reaction mixture warmed to 25°. A dark brown coloration was observed at liquid nitrogen temperature; the color became lighter as the temperature was raised. After 6 days of stirring, the solid assumed a white color. The reaction flask was then attached to a vacuum line, cooled to −196° C., and the hydrogen formed measured by means of a Toeplor pump. The amount of hydrogen was 27.5 cc. or 1.23 mmoles, corresponding to a conversion to Na$_2$S$_2$O$_4$ of 38.9% of theory, based on the initial amount NaHB(OCH$_3$)$_3$.

*Example X*

Gaseous sulfur dioxide was added incrementally to a solution of 2.46 grams (19.23 mmoles) of NaHB(OCH$_3$)$_3$ in 200 ml. of dry isopropyl alcohol, cooled to −15° C. Following each addition of sulfur dioxide, brown solid was formed in the reaction mixture. Before subsequent addition of sulfur dioxide, the mixture was stirred vigorously until the brown solid turned white. Finally, when stirring no longer removed the brown color, addition of sulfur dioxide was stopped. A sample of the reaction mixture was warmed to room temperature and treated with methyl alcohol to destroy any unreacted NaHB(OCH$_3$)$_3$. This treated sample was found to reduce indigo blue at a pH of 5, indicating the presence of sodium hydrosulfite. The isopropyl alcohol and liberated B(OCH$_3$)$_3$ were removed by vacuum distillation from the main reaction mixture and sodium hydrosulfite recovered as a white solid residue.

Although the invention has been described in considerable detail with particular reference to certain preferred embodiments thereof, it will be understood that variations and modifications can be effected within the scope of the invention as described hereinabove.

What is claimed is:
1. A process for the preparation of sodium hydrosulfite which comprises contacting a sodium trialkoxyborohydride with sulfur dioxide under anhydrous conditions at a temperature from about −30° C. to +65° C.
2. The process of claim 1 wherein the temperature is in the range of −15° C. to +25° C.
3. The process of claim 1 wherein the sodium trialkoxyborohydride is sodium trimethoxyborohydride.
4. The process of claim 1 wherein the sodium trialkoxyborohydride is sodium triisopropoxyborohydride.
5. The process of claim 1 wherein the reaction takes place in a solvent selected from the group consisting of isopropyl alcohol, tertiary butyl alcohol, dioxane, tetrahydrofuran, and diethyleneglycol dimethyl ether.
6. The process of claim 1 wherein the reaction takes place in an inert diluent selected from the group consisting of an inert hydrocarbon, a boron trialkoxide and liquid sulfur dioxide.
7. A continuous process for the preparation of sodium hydrosulfite which comprises (1) contacting sodium trialkoxyborohydride with sulfur dioxide under anhydrous conditions at a temperature from about −30° C. to +65° C. to form sodium hydrosulfite, and by-product hydrogen and boron trialkoxide, (2) separating sodium hydrosulfite from the resulting reaction product mixture and recovering said sodium hydrosulfite, (3) reacting said by-product hydrogen and boron trialkoxide with sodium to form sodium trialkoxyborohydride, and (4) recycling said sodium trialkoxyborohydride to step (1) of the process.

References Cited by the Examiner
UNITED STATES PATENTS 2,991,152   7/61   Goerrig et al. _____ 23—116

OTHER REFERENCES

Brown et al.: "Addition Compounds of Alkali Metal Hydrides, Sodium Trimethoxyborohydride and Related Compounds," Journal of The American Chemical Society, volume 75, pp. 192–195, January 5, 1963.

MAURICE A. BRINDISI, *Primary Examiner.*